United States Patent
Gianturco

(10) Patent No.: US 7,025,333 B1
(45) Date of Patent: Apr. 11, 2006

(54) HOME NAVIGATION TOOL

(76) Inventor: Mark Delio Gianturco, 9011 Mears St., Fairfax, VA (US) 22031

( * ) Notice: Subject to any disclaimer, the term of this patent is extended or adjusted under 35 U.S.C. 154(b) by 0 days.

(21) Appl. No.: 11/015,668

(22) Filed: Dec. 20, 2004

(51) Int. Cl.
*B66F 3/00* (2006.01)

(52) U.S. Cl. .......................... 254/134.3 FT
(58) Field of Classification Search ....... 254/134.3 FT, 254/134.3 R, 134.3 SC
See application file for complete search history.

(56) References Cited

U.S. PATENT DOCUMENTS

| 4,644,791 | A | 2/1987 | Sonoda et al. |
| 5,440,297 | A | 8/1995 | Bright |
| 5,467,640 | A * | 11/1995 | Salinas .................... 73/40.5 R |
| 5,588,613 | A | 12/1996 | Nagy |
| 5,681,131 | A * | 10/1997 | Goldenberg et al. ..... 405/183.5 |
| 5,820,249 | A | 10/1998 | Walsten et al. |
| 5,966,789 | A | 10/1999 | Dickson et al. |
| 6,254,026 | B1 | 7/2001 | Tsai |
| 2005/0062029 | A1* | 3/2005 | Konen et al. ....... 254/134.3 FT |
| 2005/0184279 | A1* | 8/2005 | Diggle et al. ....... 254/134.3 FT |

* cited by examiner

*Primary Examiner*—Lee D. Wilson
(74) *Attorney, Agent, or Firm*—Nixon & Vanderhye, PC

(57) ABSTRACT

A visual navigation device includes a reel mounted within a reel housing; a flexible tape wound on the reel and adapted to be payed out of the housing and into an area to be navigated, a distal end of the flexible tape incorporating a video camera; and a video monitor, operatively connected to the video camera, supported in the reel housing.

37 Claims, 4 Drawing Sheets

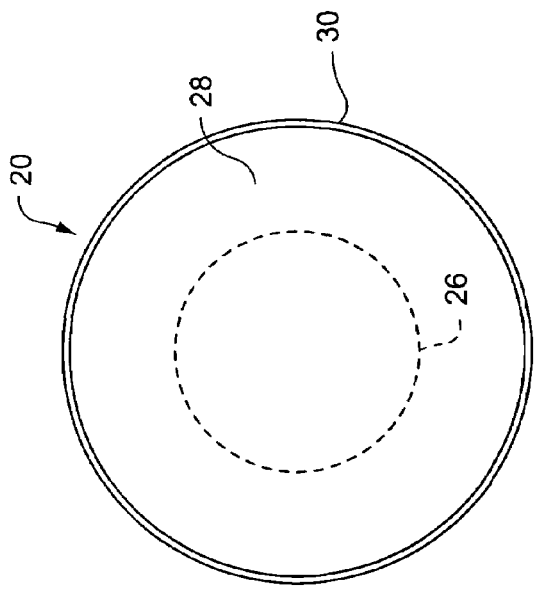
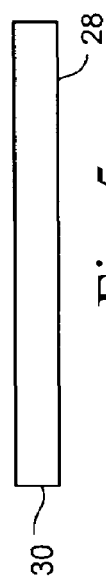
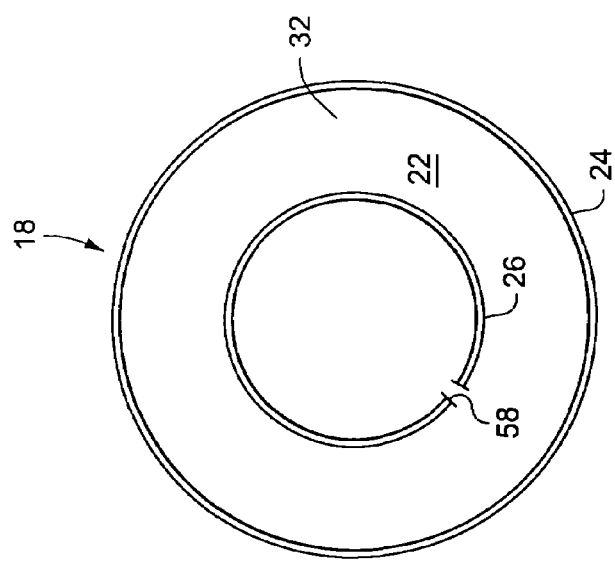
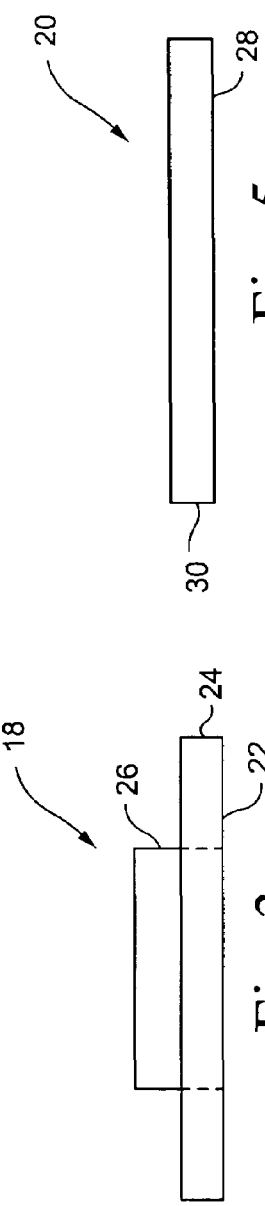

HOME NAVIGATION TOOL

BACKGROUND OF THE INVENTION

This invention relates to a portable tool for use primarily in the field of building (homes, offices and the like) repair, remodeling and construction. Specifically, the invention relates to a tool commonly referred to as a fish tape used to add electrical circuits or other wiring to inaccessible areas within, for example, an interior or exterior wall of the building structure. Optional gripper jaws permit the tool to be used for retrieval of relatively small items from other inaccessible areas as well.

A preferred method for adding electrical circuits or other wiring is to run a flexible steel wire (also known as a fish tape) behind walls and through conduits until the tape stretches from the introduction point to the destination point for the new wiring. The wiring to be added is subsequently attached to the end of the fish tape and the fish tape is withdrawn back through the space to thereby pull the new wiring into position. This can be a difficult and time-consuming job due to the inability of the worker to see into the walls or closed spaces through which the tape must pass, and the fact that the path may include several turns to navigate or to otherwise bypass obstructions.

BRIEF DESCRIPTION OF THE INVENTION

In accordance with an exemplary embodiment of this invention, a micro-video camera is integrated into the end of a fish tape, and a micro monitor is integrated into the reel housing in which the fish tape is wound. The video camera in an exemplary embodiment is accompanied preferably by one or more integrated infrared light-emitting diodes that provide illumination for the camera in the otherwise dark internal wall spaces. The entire unit is self-contained and runs on battery power, for example, a single 9-volt battery or plural AA batteries.

In another embodiment of the invention, a retrieval claw is provided at the distal end of the fish tape for use by homeowners, contractors, etc. for retrieving lost items from small enclosed areas such as drains, grates, downspouts, etc. In this embodiment, the claw may be activated by a push-button or a plunger integrated into the reel housing, enabling the user to move the claw quickly and easily between open and closed positions.

Thus, in one aspect, the present invention relates to a visual navigation device comprising a reel mounted within a reel housing; a flexible tape wound on the reel and adapted to be payed out of the housing and into an area to be navigated, a distal end of the flexible tape incorporating a video camera; and a video monitor, operatively connected to the video camera, supported in the reel housing.

In another aspect, the present invention relates to a fish tape tool for facilitating threading of a wire through an enclosed space comprising a reel mounted within a reel housing; a flexible tape wound on the reel and adapted to be payed out of the housing and into the enclosed space, a distal end of the flexible tape incorporating a wire hook and a video camera for assisting in navigating the flexible tape through the enclosed space; and a video monitor, operatively connected to the video camera, supported in the reel housing.

In another aspect, the present invention relates to a retrieval tool for retrieving items from a confined space comprising a reel mounted within a reel housing; a flexible tape wound on the reel and adapted to be payed out of the housing and into the confined space; a video camera and a retrieval claw located at a distal end of the flexible tape; and a video monitor, operatively connected to the video camera, supported in the reel housing.

In another aspect, the present invention relates to a method of fishing a flexible tape through an enclosed space comprising advancing the flexible tape into the enclosed space; utilizing an infrared light source on the flexible tape to illuminate the enclosed space; and providing a continuous video image of the enclosed space to facilitate navigation of the flexible tape through the enclosed space.

In still another aspect, the present invention relates to a method of retrieving an item from a confined space comprising advance a flexible tape into the confined space, the flexible tape provided with a retrieval claw; illuminating the enclosed space by an infrared light source secured to a distal end of the tape; providing a continuous video image of the confined space to facilitate location and removal of the item; and after locating the item, utilizing the retrieval claw to pick up the item and retrieve it from the confined space.

The invention will now be described in detail in connection with the drawings identified below.

BRIEF DESCRIPTION OF THE DRAWINGS

FIG. 2 is a side view of one half of the reel housing utilized in the tool shown in FIG. 1;

FIG. 3 is a front elevation of the housing component in FIG. 2;

FIG. 4 is a side view of the other half of the reel housing utilized in the tool shown in FIG. 1;

FIG. 5 is a front elevation of the housing component in FIG. 4;

DETAILED DESCRIPTION OF THE INVENTION

Figure 1:
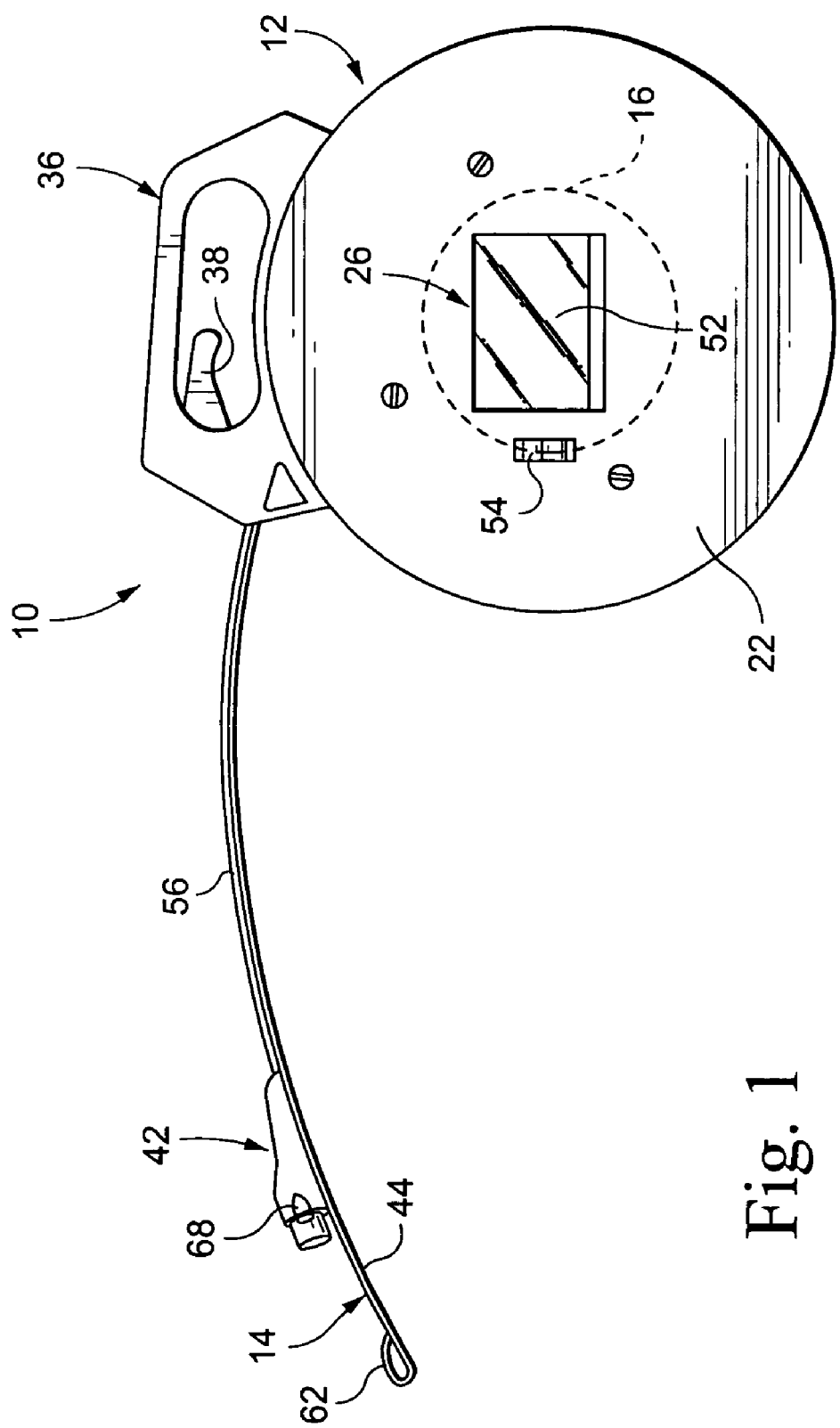
FIG. 1 is a side elevation of a fish tape tool in accordance with an exemplary embodiment of the invention with the fish tape partially extended.

With reference to FIG. 1, a fish tape tool 10 in accordance with one exemplary embodiment of the invention includes generally a reel housing 12 provided with an internal reel or hub 16 on which a flexible steel tape 14 is wound. The reel housing 12 may be of conventional construction and, as shown in FIGS. 2–5, may include a pair of housing components 18, 20 assembled in concentric and telescoping relationship. Reel housing component 18 includes a first round, flat side plate 22, a first peripheral, axially extending wall 24 and a first inner, axially extending wall 26 concentric with the first peripheral wall 24. Note that the first inner wall 26 extends axially beyond the first peripheral wall 24.

The other reel housing component 20 includes a second round, flat plate 28 and a second peripheral, axially extending wall 30.

Figure 7:
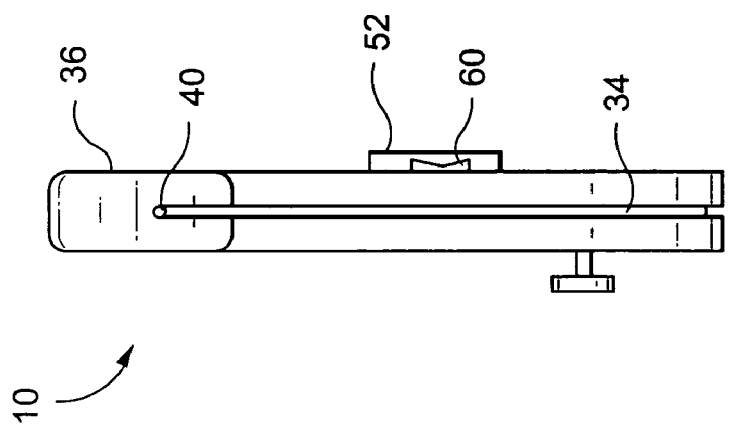
FIG. 7 is a front elevation of the fish tape tool shown in FIG. 1 but omitting the distal end of the tape.

When the housing components are assembled in telescoping relationship, an interior donut-shaped chamber 32 is established radially between the walls 24, 26 as indicated in FIG. 2. Inner wall 26 thus serves as the reel or hub 16 (FIG. 1) on which the fish tape 14 is wound, within the chamber 32. Note that the walls 24, 26 and 30 are sized so that, when the housing portions are assembled, a peripheral slot 34 (see FIG. 7) remains for allowing the fish tape to be wound and unwound from the housing.

A handle 36 is secured on the periphery of the reel housing 12 by any suitable means, for example, by an inverted T-shaped bracket, with the stem of the bracket extending through the slot 34 and the cross-piece of the bracket extending perpendicularly, across the slot 34, within the chamber 32, engaged with interior surfaces of walls 24, 30. A conventional spring-loaded trigger 38 permits the user to lock or unlock the handle relative to the reel housing. Thus, when the trigger 38 is pulled to release the handle, the housing 12 and reel or hub 16 may be rotated relative to the handle 36 to pay out the flexible steel tape 14 through an aperture 40 in the handle. Release of the trigger 38 locks the handle 36 relative to the reel housing 12 in whatever position it is in when the trigger is released, also in an otherwise conventional manner.

A micro-video camera 42 is secured proximate the distal end 44 of the flexible tape 14 and a wire 46 extends from the video camera 42 along the tape 14 and into the reel housing 16 where it is operatively connected to a video monitor 48 (see FIG. 6) supported within a space 50 inside the reel or hub 16 (the first inner reel housing wall 26), with a monitor screen 52 (see FIGS. 1 and 7) supported on the outside of the side plate 22 so as to be externally visible. An on/off switch 54 turns the camera and monitor on or off depending on the direction of movement of the switch. The wire 46 extending between the video camera 42 and the reel housing 16 may be enclosed within a flexible sleeve 56 formed by a wrapping of tape or by a discrete sleeve. The sleeve 56 may encompass the tape 14 or may simply extend along the tape, secured by the tape, adhesive or other suitable means. Note that wire 46 enters the space 50 by means of an aperture 58 in the wall 26.

The distal end 44 of the flexible tape 14 is bent to form a loop 62 that is employed to permit fastening of an electrical wire that is drawn back through the enclosed space in a typical electrical wire fishing operation.

As an alternative to extending wire 46 between the video camera 42 and video monitor 48, a miniature transmitter and power source may be integrated with the video camera 42 and a miniature receiver employed within the reel housing 16, with the receiver operatively connected to the video monitor 48 in wireless fashion.

Figure 6:
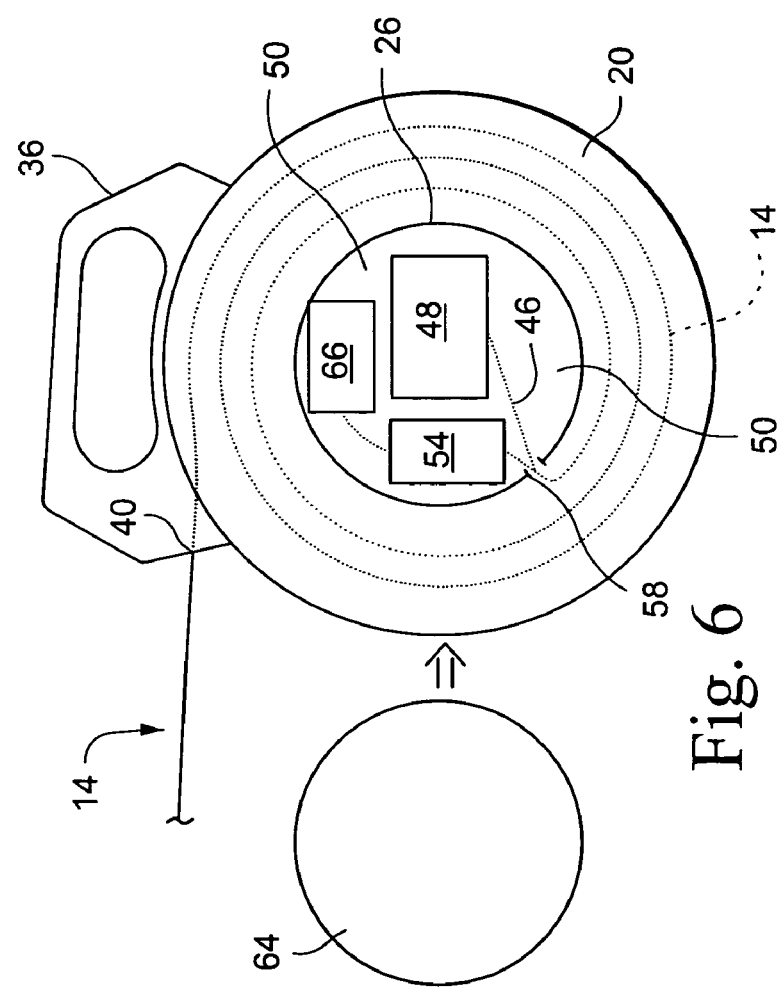
FIG. 6 is a schematic side elevation of the back side of the fish tape tool shown in FIG. 1, with a housing cover removed.
Figure 10:
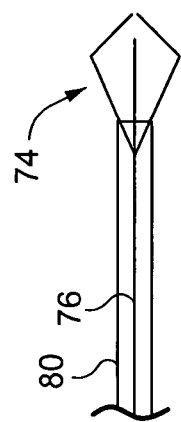
FIG. 10 is a schematic side elevation of a retrieval claw at the distal end of a fish tape used with the reel housing shown in FIGS. 8 and 9, with the claw shown in a closed position.
Figure 11:
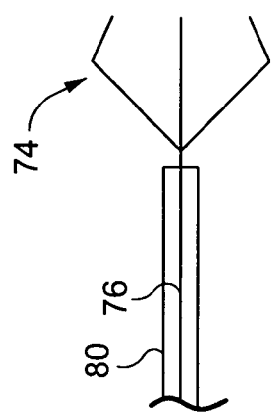
FIG. 11 is a schematic side elevation of the retrieval claw shown in FIG. 10 but in an open position.
Figure 9:
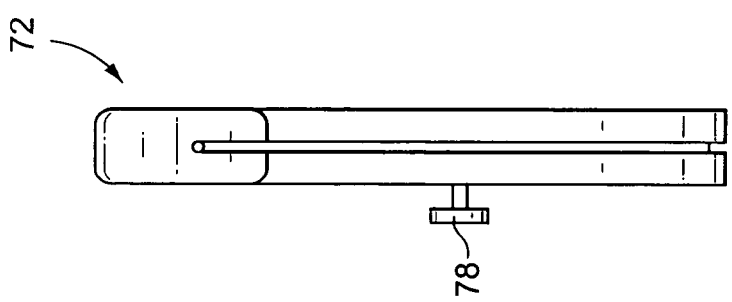
FIG. 9 is a front elevation of the fish tape reel housing shown in FIG. 4.
Figure 8:
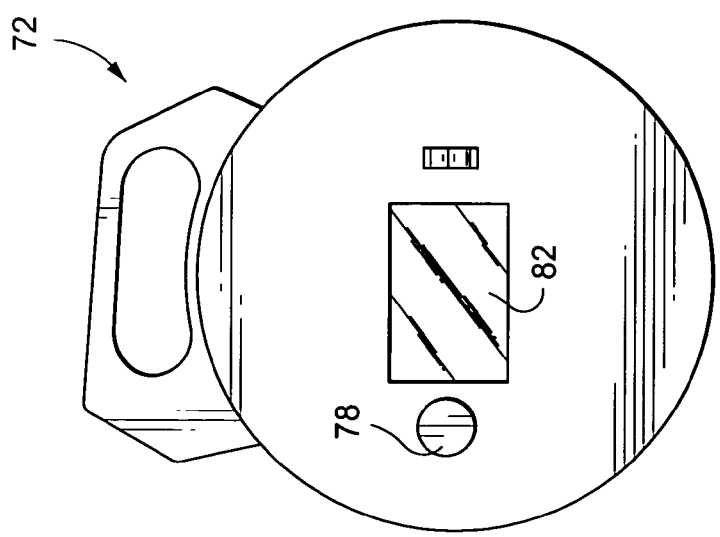
FIG. 8 is a side elevation of a fish tape reel housing in accordance with a second embodiment of the invention, adapted for use with a retrieval claw.

With reference now to FIG. 6, a cover 64 on the back of plate 20 of the reel housing 12 is removable to access the internal electronic components of the fish tape reel housing. These components include the video monitor 48, switch 54 and a power supply 66, as well as the power and video signal wire connections that run through the hole or aperture 58 in the interior wall 26 of the reel into the center cavity 50. Power supply 66 may be, for example, a single 9-volt battery or a pair or more of AA batteries.

The video camera 42 is preferably an integrated micro-video unit with both height and width dimensions less than one inch to allow the unit to be inserted through small openings. One or more high-intensity infrared light-emitting diodes (LEDs) 68 (FIG. 1) or other suitable light source may be supported adjacent the lens of the camera to provide the necessary illumination in the dark spaces through which the tape will travel.

In another embodiment illustrated in FIGS. 8–11, the tool 72 includes a spring-loaded claw 74 at the distal end of the fish tape 76 with a pushbutton or plunger 78 in a side wall that activates (opens and closes) the claw 74 by extension or retraction of the tape relative to a sleeve 80 enclosing the length of the fish tape 76 between the plunger 78 and the claw 74. Claw 74 is spring-biased toward an open position by any suitable spring arrangement. This additional feature facilitates not only the retrieval of objects from inaccessible locations around the home, but could also be used to remove clogs from drains, remove obstructions from downspouts, etc. It will be understood that a micro-video camera (not shown in FIGS. 10 and 11) similar to that shown in FIG. 1 would also be employed so that manipulation of the claw 74 would be continuously visible on the screen 82 as described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A visual navigation device comprising a reel mounted within a reel housing; a flexible tape wound on said reel and adapted to be payed out of said housing and into an area to be navigated, a distal end of said flexible tape incorporating a video camera; and a video monitor, operatively connected to the video camera, supported in said reel housing.

2. The visual navigation device of claim 1 wherein said reel housing includes a pair of side plates, and wherein said video camera includes a screen secured to one of said side plates.

3. The visual navigation device of claim 1 including an on-off switch mounted on said reel housing for activating said video camera.

4. The visual navigation device of claim 1 wherein said video camera is powered by one or more batteries located within said reel housing.

5. The visual navigation device of claim 1 wherein said video camera is operatively connected to said video monitor by a wire attached to said flexible tape.

6. The visual navigation device of claim 5 wherein said wire and said tape are enclosed within a flexible sleeve.

7. The visual navigation device of claim 1 wherein said video camera is connected to said video monitor by a wireless connection.

8. The visual navigation device of claim 1 wherein said device further comprises a light source on or adjacent said video camera.

9. The visual navigation device of claim 8 wherein said light source comprises at least one infrared light-emitting diode.

10. The visual navigation device of claim 8 wherein said light source comprises a pair of high intensity infrared light-emitting diodes.

11. The visual navigation device of claim 1 wherein a handle is located on the periphery of the reel housing, and further wherein said reel housing is rotatable relative to said handle.

12. A fish tape tool for facilitating threading of a wire through an enclosed space comprising a reel mounted within a reel housing; a flexible tape wound on said reel and adapted to be payed out of said housing and into the enclosed space, a distal end of said flexible tape incorporating a wire hook and a video camera for assisting in navigating the flexible tape through the enclosed space; and a video monitor, operatively connected to the video camera, supported in said reel housing.

13. The fish tape tool of claim 12 wherein said reel housing includes a pair of side plates, and wherein said video camera includes a screen secured to one of said side plates.

14. The fish tape tool of claim 12 including an on-off switch mounted on said reel housing for activating said video camera.

15. The fish tape tool of claim 12 wherein said video camera is powered by one or more batteries located within said reel housing.

16. The fish tape tool of claim 12 wherein said video camera is operatively connected to said video monitor by a wire attached to said flexible tape.

17. The fish tape tool of claim 16 wherein said wire and said tape are enclosed within a flexible sheath.

18. The fish tape tool of claim 12 wherein said video camera is connected to said video monitor by a wireless connection.

19. The fish tape tool of claim 12 wherein said tool further comprises a light source on or adjacent said video camera.

20. The fish tape tool of claim 19 wherein said light source comprises at least one infrared light-emitting diode.

21. The fish tape tool of claim 18 wherein said light source comprises a pair of high intensity infrared light-emitting diodes.

22. The fish tape tool of claim 12 wherein a handle is located on the periphery of the reel housing, and further wherein said reel housing is rotatable relative to said handle.

23. A retrieval tool for retrieving items from a confined space comprising a reel mounted within a reel housing; a flexible tape wound on said reel and adapted to be payed out of said housing and into the confined space; a video camera and a retrieval claw located at a distal end of said flexible tape; and a video monitor, operatively connected to the video camera, supported in said reel housing.

24. The retrieval tool of claim 23 wherein said reel housing includes a pair of side plates, and wherein said video camera includes a screen secured to one of said side plates.

25. The retrieval tool of claim 23 including an on-off switch mounted on said reel housing for activating said video camera.

26. The retrieval tool of claim 23 wherein said video camera is powered by one or more batteries located within said reel housing.

27. The retrieval tool of claim 23 wherein said video camera is operatively connected to said video monitor by a wire attached to said flexible tape.

28. The retrieval tool of claim 27 wherein said wire and said tape are enclosed within a flexible sheath.

29. The retrieval tool of claim 23 wherein said video camera is connected to said video monitor by a wireless connection.

30. The retrieval tool of claim 23 further comprising a light source on or adjacent said video camera.

31. The retrieval tool of claim 30 wherein said light source comprises at least one infrared light-emitting diode.

32. The retrieval tool of claim 30 wherein said light source comprises a pair of high intensity infrared light-emitting diodes.

33. The retrieval tool of claim 23 including means for moving said retrieval claw between open and closed positions.

34. The retrieval tool of claim 33 including an actuator on said housing operatively connected to said retrieval claw.

35. The retrieval tool of claim 34 wherein said retrieval claw is axially movable in and out of a sleeve, and wherein said retrieval claw is spring-biased to said open position.

36. A method of fishing a flexible tape through an enclosed space comprising:
   advancing the flexible tape into the enclosed space;
   utilizing a light source on said flexible tape to illuminate the enclosed space; and
   providing a continuous video image of the enclosed space to facilitate navigation of the flexible tape through the enclosed space.

37. A method of retrieving an item from a confined space comprising:
   advance a flexible tape into the confined space, the flexible tape provided with a retrieval claw;
   illuminating the enclosed space by a light source secured to a distal end of the tape;
   providing a continuous video image of the confined space to facilitate location and removal of the item; and
   after locating the item, utilizing said retrieval claw to pick up the item and retrieve it from the confined space.

* * * * *